(12) United States Patent
Karri et al.

(10) Patent No.: US 12,555,326 B2
(45) Date of Patent: Feb. 17, 2026

(54) EXTENDED REALITY CONTENT NAVIGATION

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Akash U. Dhoot, Pune (IN); Krishna Jethani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 17/484,544

(22) Filed: Sep. 24, 2021

(65) Prior Publication Data

US 2023/0105621 A1 Apr. 6, 2023

(51) Int. Cl.
*G06T 19/00* (2011.01)
*H04L 65/401* (2022.01)

(52) U.S. Cl.
CPC ........ *G06T 19/003* (2013.01); *H04L 65/4015* (2013.01); *G06T 2219/024* (2013.01)

(58) Field of Classification Search
None
See application file for complete search history.

(56) References Cited

U.S. PATENT DOCUMENTS 11,295,511 B1 * 4/2022 Yosifov .................. G06T 11/206
2010/0269054 A1 10/2010 Goldberg et al.
2015/0007225 A1 1/2015 Strong
2020/0097243 A1 * 3/2020 Vembar ................ G06F 3/1454
(Continued)

FOREIGN PATENT DOCUMENTS

| CN | 110782653 A | 2/2020 |
|---|---|---|
| CN | 111105294 A | 5/2020 |
| WO | 2018112643 A1 | 6/2018 |

OTHER PUBLICATIONS

Fadzli et al., "3D Telepresence for Remote Collaboration in Extended Reality Application" (Year: 2020).*

(Continued)

*Primary Examiner* — Hilina K Demeter
(74) *Attorney, Agent, or Firm* — CHIP LAW GROUP

(57) ABSTRACT

An extended reality (XR) navigation system includes computer hardware having a VR content navigation platform (CNP) connected to XR systems respectively associated with a plurality of users and configured to perform to perform the following. A VR object being contemporaneously viewed by the plurality of users is identified by the CNP. Respective fields of view of the VR object being presented by the XR systems are identified by the CNP for each of the plurality of users. A plurality of potential collaborators are identified using a collaboration engine. Collaboration requests are forwarded to XR systems respectively associated with the plurality of potential collaborators. Instructions to present a shared field of view are forwarded to XR systems respectively associated with a plurality of users who positively responded to the collaboration requests, and these XR systems are configured to simultaneously present the shared field of view during a collaboration.

20 Claims, 9 Drawing Sheets

(56) References Cited

U.S. PATENT DOCUMENTS

| | | | |
|---|---|---|---|
| 2020/0167120 A1 | 5/2020 | Rakshit et al. | |
| 2022/0070238 A1* | 3/2022 | Yerli | H04L 65/4015 |
| 2022/0086205 A1* | 3/2022 | LeBeau | G06F 3/011 |
| 2022/0124283 A1* | 4/2022 | Krol | H04N 21/44 |
| 2023/0098395 A1* | 3/2023 | O'Leary | H04N 7/15 348/14.03 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

Piumsomboon, T. et al., "CoVAR: A Collaborative Virtual and Augmented Reality System for Remote Collaboration," In SIGGRAPH Asia 2017 Emerging Technologies, Nov. 27, 2017, pp. 1-2.

Schild, J.et al., "Applying Multi-User Virtual Reality to Collaborative Medical Training," In2018 IEEE Conference on Virtual Reality and 3D User Interfaces (VR), Mar. 18, 2018, pp. 775-776). IEEE.

"Method and System for Facilitating Fast Collaboroative Engagement of User4s using Augmented Reality (AR)," IP.com Prior Art Database, Technical Disclosure No. IPCOM000250397D, Jul. 11, 2017, 3 pg.

Daniele, A.F. et al., "Navigational Instruction Generation as Inverse Reinforcement Learning with Neural Machine Translation,"In2017 12th ACM/IEEE International Conference on Human-Robot Interaction (HRI) Mar. 6, 2017, pp. 109-118, IEEE.

Reitmayr, G. et al., "Collaborative augmented reality for outdoor navigation and information browsing," InProceedings of the 2nd Symposium on Location Based Services and TeleCartography, Jan. 28, 2004, (pp. 53-62).

Garcia, A.S. et al., "Collaborative virtual reality platform for visualizing space data and mission planning," Multimedia Tools and Applications, Dec. 1, 2019, vol. 78, No. 23, pp. 33191-33220.

Chen, W., "Collaboration in Multi-user Immersive Virtual Environment," Doctoral dissertation, Université Paris Saclay (COmUE), Nov. 21, 2016, 172 pg.

Fraser, M. et al., "Revealing the realities of collaborative virtual reality," InProceedings of the Third International Conference on Collaborative Virtual Environments, Sep. 1, 2000, pp. 29-37.

Li, Y. et al., "Gaze direction visualization techniques for collaborative wide-area model-free augmented reality," InSymposium on Spatial User Interaction, Oct. 19, 2019, pp. 1-11.

* cited by examiner

EXTENDED REALITY CONTENT NAVIGATION

BACKGROUND

The present invention relates to displaying digital content using an extended reality (XR) device, and more specifically, to dynamically controlling parallel navigation of virtual reality (VR) content using XR technology.

Industry 4.0 is revolutionizing the way companies manufacture, improve and distribute their products. Manufacturers are integrating new technologies, including Internet of Things (IoT), cloud computing and analytics, and AI and machine learning into their production facilities and throughout their operations. These digital technologies lead to increased automation, predictive maintenance, self-optimization of process improvements and, above all, a new level of efficiencies and responsiveness to customers not previously possible.

Some of the technologies being employed as part of Industry 4.0 is through the use of extended reality devices. Extended reality (XR) is an umbrella term used to describe a number of related, albeit different technologies used to augment human senses. These technologies include augmented reality (AR), virtual reality (VR), and mixed reality (MR). AR typically involves overlaying digital elements onto a real world view. In other words, a real world view (e.g., a still photo or video) is altered to include additional digital elements that have some perceived relationship with the real world view. VR typically involves the creation of an immersive completely digital environment that can be viewed and interacted with by a user. In MR, aspects of both AR and VR are mixed. These technologies are typically device dependent. For example, a smartphone can be used with AR whereas VR typically requires a head mounted display/headset. MR devices can include transparent wearable glasses that present an overlay of digital content that interacts with real word objects in real-time.

As used herein, the term "XR device" or "XR system" refers to a particular computer-implemented device including one or more of AR, VR, and MR technologies. As used herein, the term "VR object" refers to a digital object being displayed by an XR device regardless of the XR technology being employed. As used herein, the term "VR environment" refers to a digitally-created space in which a VR object can be displayed. As used herein, the term "VR content" refers to all of the VR objects found within the VR environment.

One use of XR involves a number of users investigating a particular real world object, such as machine or an object to be manufactured. For example, a problem may arise that requires investigation of the machine/object. In the past, this would require different members of the team investigating the problem to assemble together at a common real-world location to view the real-world machine/object. However, the use of XR along with a VR object representing the machine/object allows members of the team, despite being physically located in different places, to concurrently view the machine/object (or a virtual representation thereof) and to collaborate as to a solution to the problem. Given the nature of a VR environment, each participant has independent control over the particular field of view (FOV) being presented by the XR system. Consequently, each participant of the team can be concurrently viewing different FOVs of the VR object.

In such a situation, one participant of a team investigating the problem may identify a problem location in the VR object in the VR environment, and might want to notify/invite other participants to look at the problem location or might want to give a suggestion towards the identified area. In this situation, the initial participant would have to communicate to the other collaborative participants to look in a similar viewing direction of the participant. Otherwise, the other collaborative participants may not be able to see what the initial participant sees. However, because of the independent nature of each XR device, coordinating a common viewing direction or FOV can be challenging.

SUMMARY

A computer-implemented process within a virtual reality (VR) content navigation platform connected to XR systems respectively associated with a plurality of users is disclosed. A VR object being contemporaneously viewed by the plurality of users is identified by the VR content navigation platform. Respective fields of view of the VR object being presented by the XR systems respectively associated with the plurality of users are identified by the VR content navigation platform for each of the plurality of users. A plurality of potential collaborators are identified using a collaboration engine. Collaboration requests are forwarded to XR systems respectively associated with the plurality of potential collaborators. Instructions to present a shared field of view are forwarded to XR systems respectively associated with a plurality of users who positively responded to the collaboration requests. Each of the XR systems respectively associated with the plurality of users who positively responded to the collaboration requests are configured to simultaneously present the shared field of view during a collaboration. The shared field of view is dynamically controlled by one of the plurality of users associated with the collaboration.

The computer-implemented process can also include the collaboration engine identifying the plurality of potential collaborators using a common area of interest. The common area of interest is automatically generated using the collaboration engine. For example, the common area of interest can be predicted based upon on an analysis of the respective fields of view of the VR object being presented by the XR systems respectively associated with the plurality of users. Also, the common area of interest can be based upon user input received from each of the plurality of users. The VR content navigation platform can record and store the collaboration. Also, the VR content navigation platform is operatively connected to a collaboration server hosting the collaboration.

An extended reality (XR) navigation system includes computer hardware having a VR content navigation platform connected to XR systems respectively associated with a plurality of users. The computer hardware is configured to perform to perform the following. A VR object being contemporaneously viewed by the plurality of users is identified by the VR content navigation platform. Respective fields of view of the VR object being presented by the XR systems respectively associated with the plurality of users are identified by the VR content navigation platform for each of the plurality of users. A plurality of potential collaborators are identified using a collaboration engine. Collaboration requests are forwarded to XR systems respectively associated with the plurality of potential collaborators. Instructions to present a shared field of view are forwarded to XR systems respectively associated with a plurality of users who positively responded to the collaboration requests. Each of the XR systems respectively associated with the plurality of users who positively responded to the collaboration requests are configured to simultaneously present the shared field of view during a collaboration. The shared field of view is dynamically controlled by one of the plurality of users associated with the collaboration.

The parallel presentation system can also include the collaboration engine identifying the plurality of potential collaborators using a common area of interest. The common area of interest is automatically generated using the collaboration engine. For example, the common area of interest can be predicted based upon on an analysis of the respective fields of view of the VR object being presented by the XR systems respectively associated with the plurality of users. Also, the common area of interest can be based upon user input received from each of the plurality of users. The VR content navigation platform can record and store the collaboration. Also, the VR content navigation platform is operatively connected to a collaboration server hosting the collaboration.

A computer program product includes computer readable storage medium having stored therein program code. The program code, which when executed by a computer hardware system including a VR content navigation platform connected to XR systems respectively associated with a plurality of users, causes the computer hardware system to perform the following operations. A VR object being contemporaneously viewed by the plurality of users is identified by the VR content navigation platform. Respective fields of view of the VR object being presented by the XR systems respectively associated with the plurality of users are identified by the VR content navigation platform for each of the plurality of users. A plurality of potential collaborators are identified using a collaboration engine. Collaboration requests are forwarded to XR systems respectively associated with the plurality of potential collaborators. Instructions to present a shared field of view are forwarded to XR systems respectively associated with a plurality of users who positively responded to the collaboration requests. Each of the XR systems respectively associated with the plurality of users who positively responded to the collaboration requests are configured to simultaneously present the shared field of view during a collaboration. The shared field of view is dynamically controlled by one of the plurality of users associated with the collaboration.

The computer program product can also include the collaboration engine identifying the plurality of potential collaborators using a common area of interest. The common area of interest is automatically generated using the collaboration engine. For example, the common area of interest can be predicted based upon on an analysis of the respective fields of view of the VR object being presented by the XR systems respectively associated with the plurality of users. Also, the common area of interest can be based upon user input received from each of the plurality of users. The VR content navigation platform can record and store the collaboration. Also, the VR content navigation platform is operatively connected to a collaboration server hosting the collaboration.

DETAILED DESCRIPTION

Figure 1:
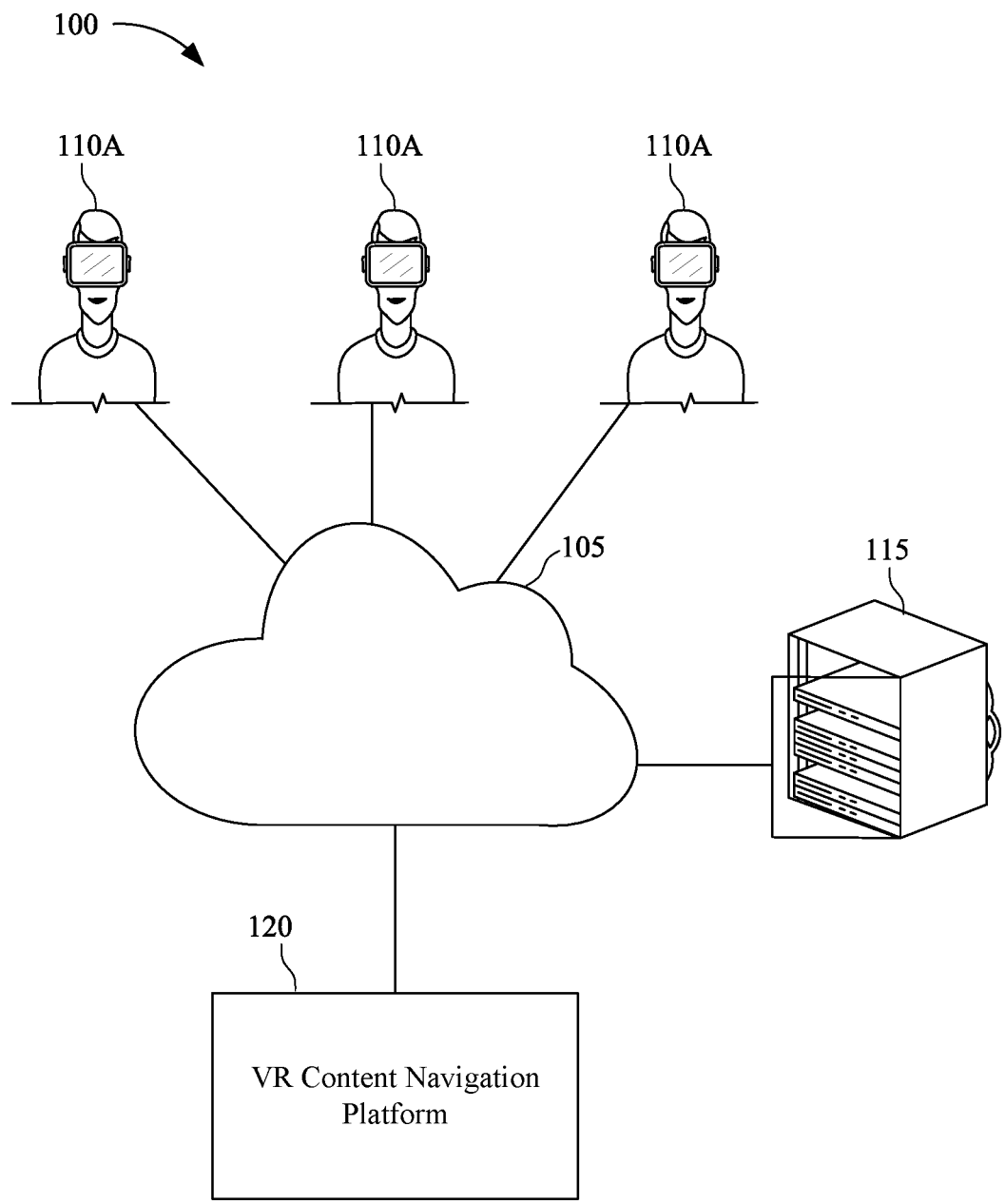
FIG. 1 is a block diagram illustrating an example VR content navigation system according to an embodiment of the present invention.
Figure 2:
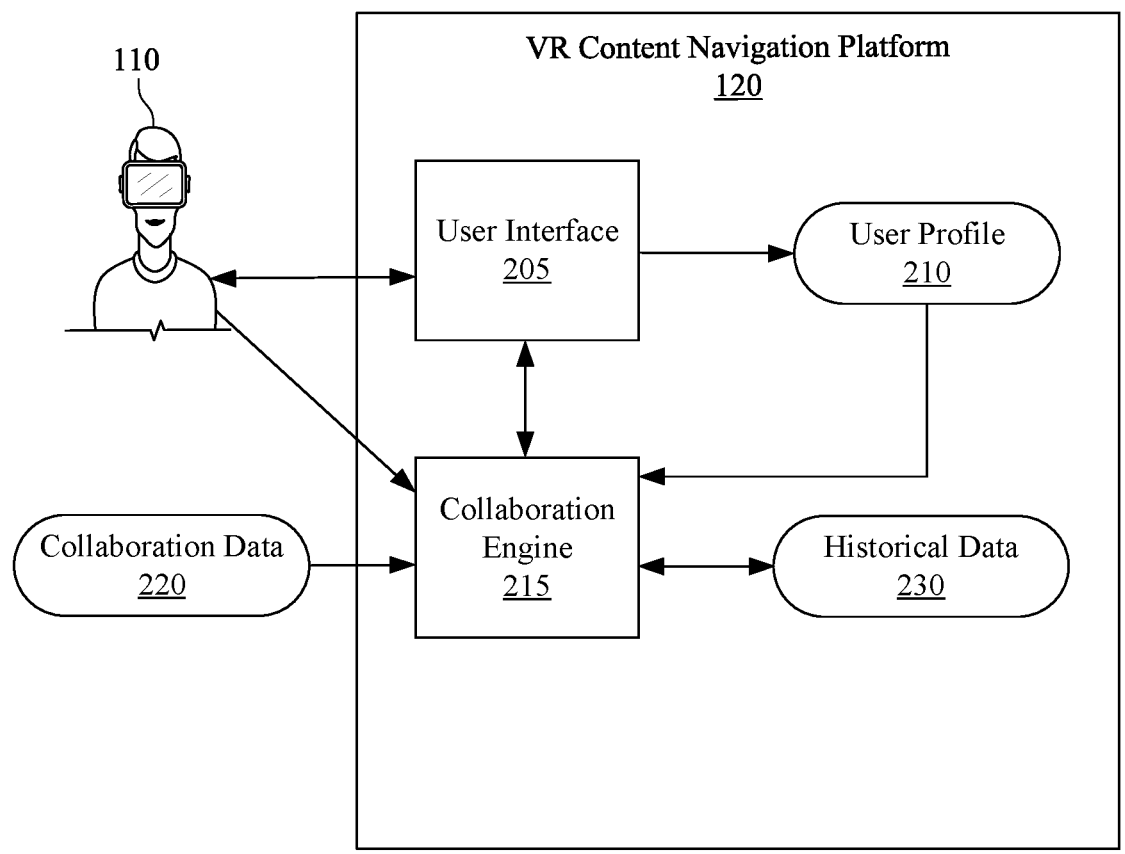
FIG. 2 is a block diagram illustrating an example architecture of a VR content navigation platform for use with the VR content navigation system of FIG. 1 according to an embodiment of the present invention.
Figure 3:
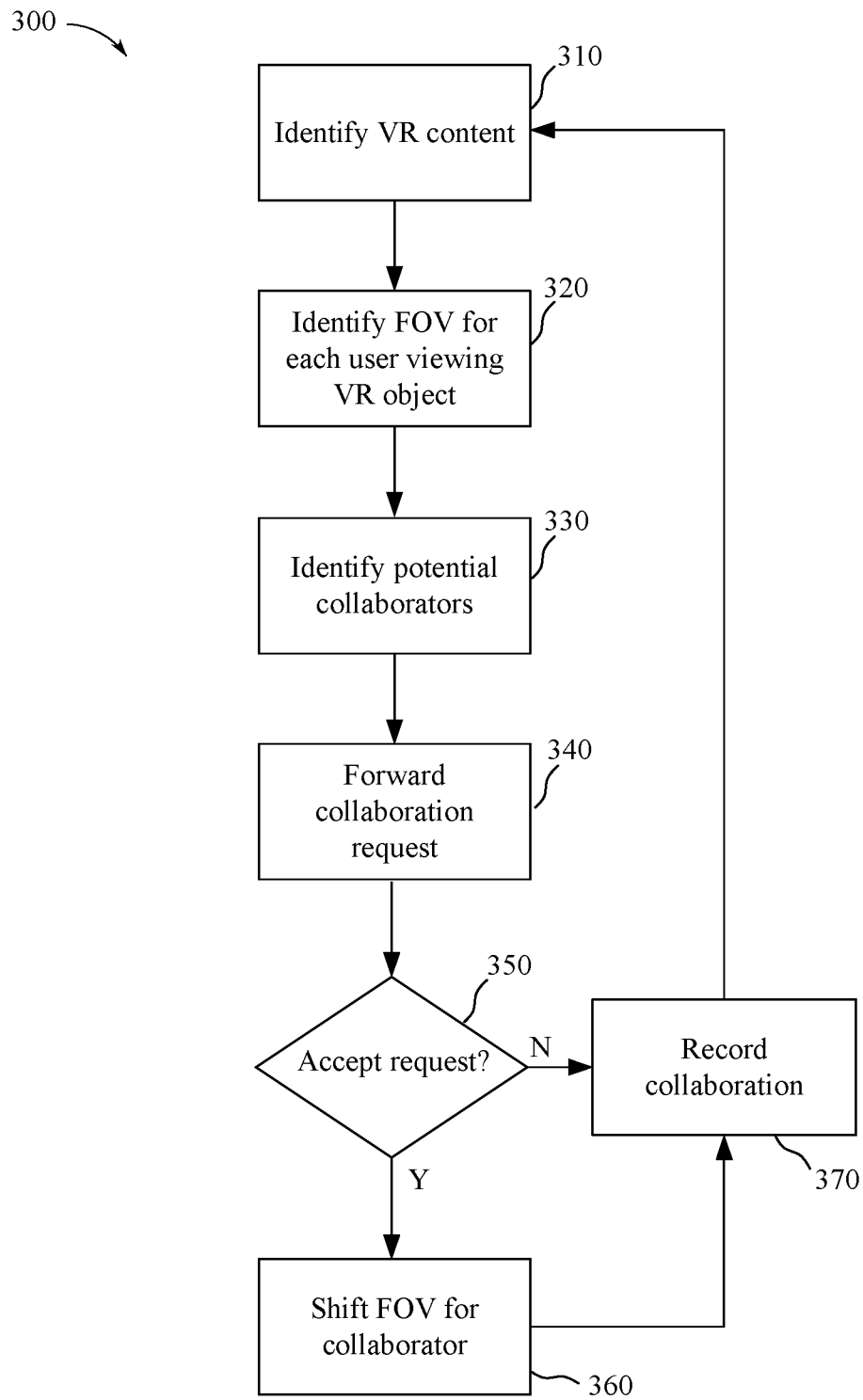
FIG. 3 is a block diagram illustrating an example method using the VR content navigation system of FIG. 1 according to an embodiment of the present invention.

Reference is made to FIG. 1 and FIG. 3 which respectively illustrate an virtual reality (VR) content navigation system 100 and methodology 300 for dynamically controlling parallel navigation of VR content using extended reality (XR) technology. The VR content navigation system 100 includes one of more user devices, each with an XR device 110 (further described with regard to FIG. 5), and a VR content navigation platform 120 (further described with regard to FIG. 2). The VR content navigation system 100 can also include a collaboration server 115 that facilitates collaboration between the XR devices 110. Although shown separately, a portion or all of the VR content navigation platform 120 can be integrated within the collaboration server 115. As used herein the term "user" refers to a human user, and the term "user device" refers to a particular device associated with a particular user. However, as used herein, use of the terms "user device" or "user," by association, can additionally or alternatively refer to the other term as well, as appropriate.

In operation, a VR object 400 (illustrated in FIGS. 4A, 4B) being contemporaneously viewed by the plurality of users is identified by the VR content navigation platform 120. Respective fields of view of the VR object 400 being presented by the XR systems 110A-F respectively associated with the plurality of users are identified by the VR content navigation platform 120 for each of the plurality of users. A plurality of potential collaborators are identified using a collaboration engine 215. Collaboration requests are forwarded to XR systems 110A, 110C, 110D respectively associated with the plurality of potential collaborators. Instructions to present a shared field of view are forwarded to XR systems 110A, 110C, 110D respectively associated with a plurality of users who positively responded to the collaboration requests. Each of the XR systems 110A, 110C, 110D respectively associated with the plurality of users who positively responded to the collaboration requests are configured to simultaneously present the shared field of view during a collaboration. The shared field of view is dynamically controlled by one of the plurality of users 110F associated with the collaboration.

More specifically, reference is made to the operations of the process 300 illustrated in FIG. 3. In 310, the VR content navigation platform 120 identifies a VR object 400 (illustrated in FIGS. 4A, 4B) being contemporaneously viewed by a plurality of users with respective user devices 110. The VR content navigation platform 120 is not limited in the manner in which the VR object 400 concurrently being view is identified. For example, each user device 110 may communicate the particular VR object 400 being viewed to the VR content navigation platform 120. Alternatively, the collaboration server 115 may be managing the collaboration between the user devices 110 and the collaboration server 115 can communicate an identity of the VR object 400 being viewed in the collaboration to the VR content navigation platform 120.

Figure 4A:
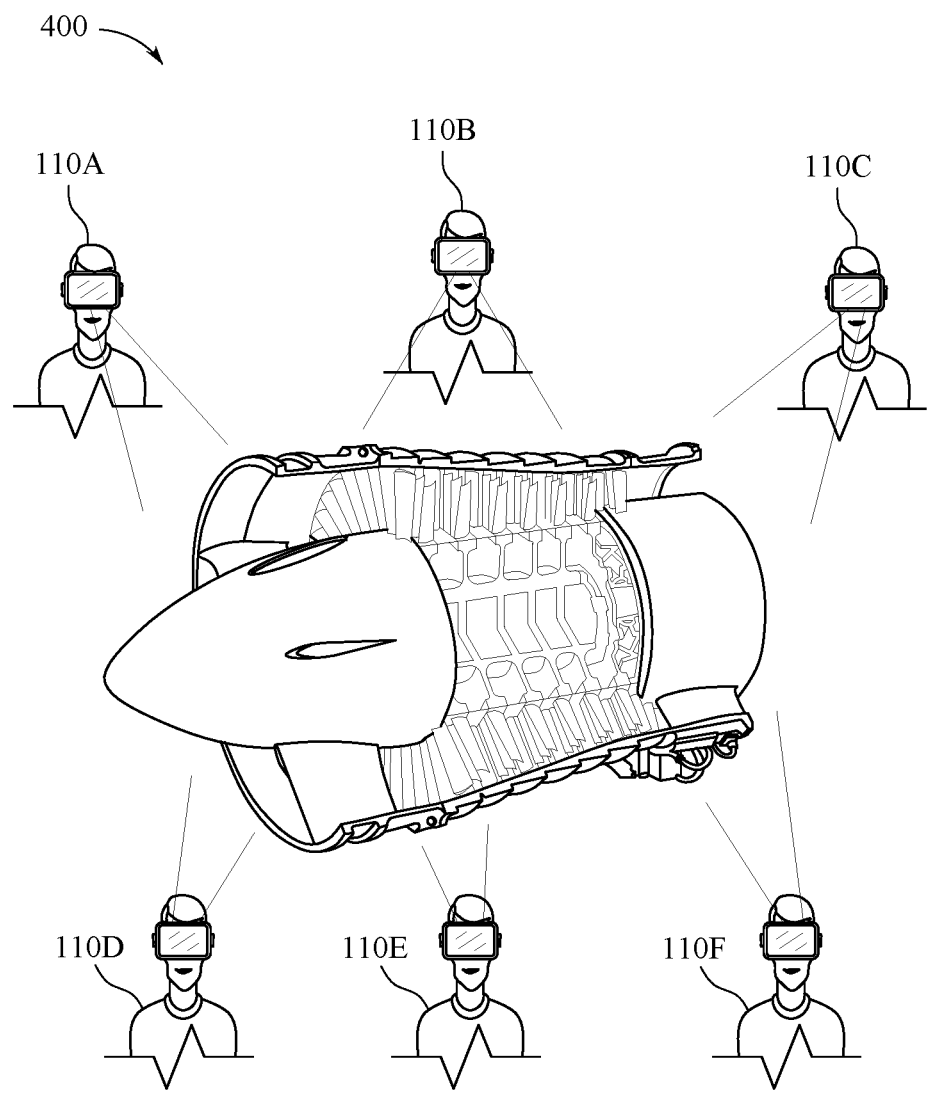
FIGS. 4A, 4B are block diagrams respectively illustrating example fields of view (FOV) for a plurality of users viewing a VR object according to an embodiment of the present invention.

In 320, the VR content navigation platform 120 identifies, for each of the plurality of user devices 110, respective fields of view (FOV) of the VR object 400 being presented by the user devices 110. FIG. 4A illustrates, as an example, six users (i.e., 100A-F) having 6 different FOVs of object 400. Again, the VR content navigation platform 120 is not limited in the manner in which respective FOV of the VR object 400 being presented by the user devices 110 are identified. For example, each user device 110 may communicate the particular FOV being presented therein to VR content navigation platform 120. Alternatively, the collaboration server 115 may be managing the collaboration between the user devices 110, and the collaboration server 115 can communicate each FOV being provided to respective user devices 110 to the VR content navigation platform 120.

In 330, the collaboration engine 215 of the VR content navigation platform 120 generates potential collaboration combinations of a number of users. There are a number of different approaches to generating these potential collaboration combinations of users, and the VR content navigation platform 120 is not limited to a particular approach. However, in one aspect the collaboration engine 215 can use information from each user device 110 as well as collaboration data 220 (e.g., from the collaboration server 115) to predict common areas of interest among the users. Additionally, the collaboration engine 215 can include a machine language engine that uses information about each user stored in a user profile 210 and/or historical data 230 regarding past collaborations to contextually analyze the respective FOV of the VR object 400 currently being presented to the user devices 110.

As an example, the user profiles 210 may include information about areas of expertise of the users, and the historical data 230 may include data on past collaborations that previously involved the real world object to which the VR object 400 corresponds, past collaborations with which one or more of the users were previously associated to identify a particular user having a high likelihood of success in identifying a particular problem and those other users that may have an interest in the problem and/or be of assistance in solving the problem. Those individuals so identified would constitute a potential collaboration combination of users.

Additionally, the user profiles 210 may include respective areas of interest submitted to the VR content navigation platform 120 via the user interface 205. As another example, the VR content navigation platform 120, using the collaboration engine 215, can perform contextual analysis using a machine learning engine on past collaborations, stored within the historical data 230, to generate areas of interest for the respective users that can be also be subsequently stored within the user profiles 210.

Additionally, the collaboration engine 215 may use real-time data received from the user devices 110 and/or as collaboration data 220 indicating that a particular area of the VR object 400 is an area of interest. Although not limited in this manner, an example of real-time data indicating that a particular area of the VR object 400 is an area of interest would be a particular user manipulating a particular area of the VR object 400 such as zooming in on a particular area or manipulating the VR object 400 in the VR environment—indicating an increased level of interest. Another example of real-time data indicating that a particular area of the VR object 400 is an area of interest, would be a user requesting additional data about a particular area (e.g., by posing a question, electronically or aurally, to the group of users or by performing a search pertaining to the particular area)—again, indicating an increased level of interest. Once one user 110F indicates a particular area of the VR object 400 is an area of interest, the collaboration engine 215 can use one or more of the user profile 210, historical data 230, and other real-time data to predict that other users may find the same particular area of the VR object 400 to be a common area of interest. This is an additional/alternative approach to generating a potential collaboration combination of users.

Depending upon the circumstances, the collaboration engine 215 can generate a single potential collaboration combination of a number of users or multiple potential collaboration combinations of a number of users. If multiple combinations are generated, the collaboration engine 215 can perform a ranking of these collaboration combinations to select a best combination determined to provide a positive result. In generating the potential collaboration combination, the collaboration engine 215 selects one user whose FOV is the FOV to be shared-referred to herein as the sharing user 110F and the shared FOV. In certain aspects, this FOV to be shared would be looking at the particular area of the VR object 400 that is deemed, by the collaboration engine 215, to be a common area of interest.

In 340, upon identifying a potential collaboration combination, the VR content navigation platform 120, via the user interface 205, forwards collaboration requests to each of the users within the potential collaboration combination. The purpose of a collaboration request is to request that the particular user receiving the collaboration request join in a collaboration regarding a selected FOV of the VR object 400. In certain aspects, whether the requested user joins the collaboration can be optional or mandatory. For example, the collaboration engine 215, based upon a contextual analysis of the user profile 210, may determine that one particular user is mandatory because of this user's expertise while two other users are optional. Other approaches to determining whether the requested user is determined to be optional or mandatory are also possible.

Additionally, the collaboration request may also include information that may be useful in informing a requested user whether to join the collaboration. For example, an expert in the problem has identified an area of interest, the request may include a statement such as "Ms. D is an expert in the problem and has begun inspecting X part, do you want to join in?". As another example the statement might be "your supervisor is now viewing Z part, do you want to join?".

Figure 4B:
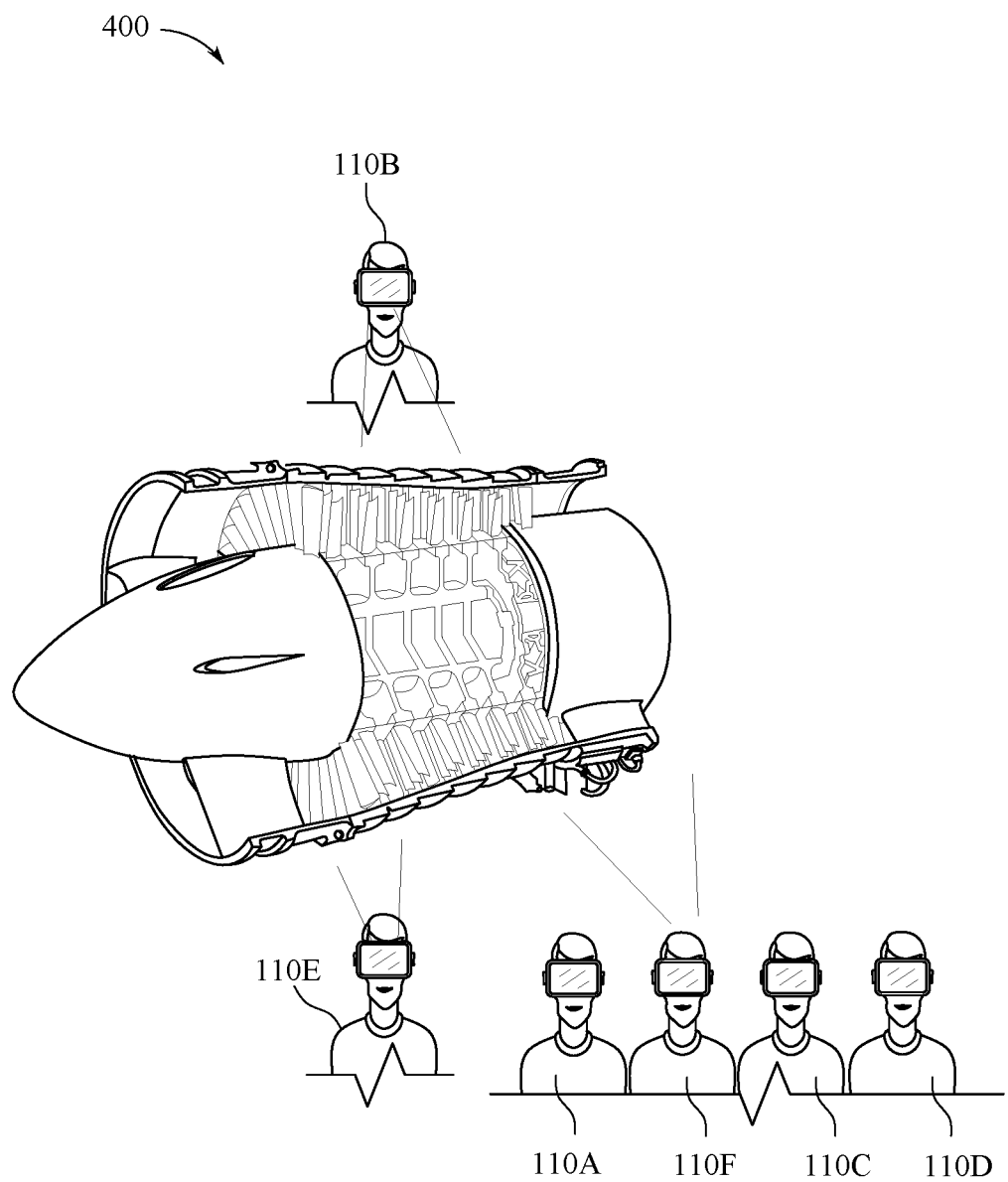

In 350, the user interface 205 of the navigation platform 120 receives an indication from the requested users whether they accept to join in the collaboration. Upon acceptance by a requested user, in 360, the FOV of the requested user(s) 110A, 110C, 110D is shifted to the FOV of the sharing user 110F, as illustrated in FIG. 4B. Although not limited in this manner, this can involve the VR content navigation platform 120 sending instructions, to each of the users who positively responded to the collaboration requests, that instruct the XR devices associated with each of the respective user devices 110 of these users to present the shared FOV. Alternatively, the navigation platform 120 can communicate the identities of each of the users who positively responded to the collaboration requests as well as the identity of the shared FOV to the collaboration server 115, and the collaboration server 115 can transmit this shared FOV to the one or more users who positively responded to the collaboration requests.

Notably, the shared FOV is dynamically controlled by the sharing user 110F for all of the users who positively responded to the collaboration requests. In this regard, dynamic control of the shared FOV means that the FOV of the sharing user 110F is real-time replicated as the FOV of the requested user(s) 110A, 110C, 110D. In this manner, as the FOV of the sharing user 110F changes, the FOV of the requested user(s) 110A, 110C, 110D is also changed consistent with the FOV of the sharing user 110F.

Additionally, to the extent that representations of the users are displayed in the VR environment, each of the users who positively responded to the collaboration requests can have their respective representations placed around a representation of the sharing user 110F within the VR environment.

The VR content navigation platform 120 alone or in combination with the collaboration server 115 and/or the user devices 110 can store a last state of the FOV for a particular user prior to the particular user being shifted to the FOV of the sharing user 110F. In this manner, after the collaboration, a user can return to this last state. Additionally, a particular user is not limited to a single collaboration. If the particular user is requested to participate in multiple collaborations, the XR systems of the user devices 110 can simultaneously presented different FOV associated with these multiple collaborations, for example, in a split screen of the XR system.

In 370, regardless of whether a user accepted a collaboration request or not, the VR content navigation platform 120 and/or the collaboration server 115 can record the collaboration. As used herein, the term "collaboration" refers to a digital record concurrently-generated (i.e., generated in parallel) by a plurality of users. For example, a collaboration may include a visual recording of the FOV, chat messages of the collaborators, audio from the collaborators, among others. This record of the collaboration can be used by both users who joined the collaboration and users who did not. Additionally, this collaboration can be stored as historical data 220 to be part of the contextual analysis for future collaborations. For example, the collaboration may establish the one particular user was very engaged in the collaboration-indicating that this particular user had a particular interest/expertise in the particular problem being addressed.

Figure 5:
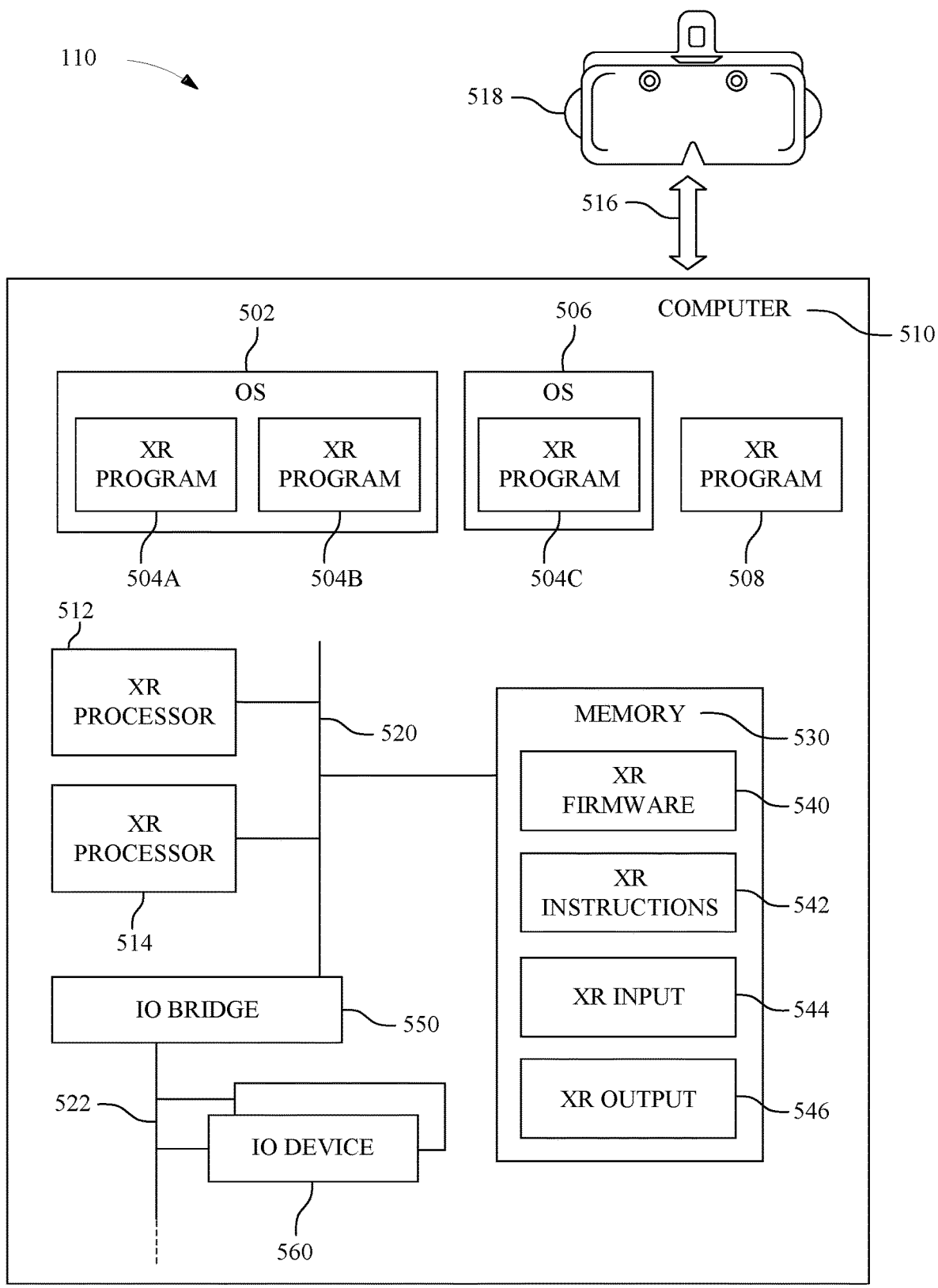
FIG. 5 is a block diagram illustrating an example computer hardware system for implementing the AR system of FIG. 1

FIG. 5 is an example of an example of the XR system 110 previously illustrated in FIG. 1. As shown, the XR system 110 includes an audio/video (A/V) headset 518, as referred to as smart glasses, augmented reality device or a virtual reality headset. The XR system 110 also includes a XR computer 510. Although illustrated as being separate from the headset 518, one or more portions of the XR computer 510 can be embedded within the headset 518. The example XR system 110, and/or components thereof, are not intended to be necessarily limiting as to the present disclosure.

The XR computer 510 can include one or more XR processors 512, 514, which can be a single processor or a multi-threaded processor, a general purpose or a special purpose processor, a co-processor, or any of a variety of processing devices that can execute computing instructions. If one or more portions of the XR computer 510 are separate from the headset 518, interface 516 couples XR computer 510 to the headset 518. The XR processors 512, 514 can be connected by memory interface 520 to memory 530, which can be a cache memory, a main memory, a flash memory, or a combination of these or other varieties of electronic hardware devices capable of storing information and, optionally, making the information, or locations storing the information within the memory, accessible to the XR processors 512, 514. The XR computer 510 can include an IO bridge 350, which can be connected to the memory 530 and/or XR processors 512, 514 by a memory interface 320. The IO bridge 550 can interface with the memory interface 520 to IO devices, such as IO device 560. The interface 522 can be any of a variety of IO interfaces, such as a PCI-Express (PCI-E) bus, and IO bridge 550 can, correspondingly, be a PCI-E bridge, and IO device 560 can be a PCI-E device (e.g., a disk drive), or PCI-E adapter (e.g., a network interface card, or a disk adapter). The IO devices 560—an be any of a variety of peripheral IO devices or IO adapters connecting to peripheral IO devices. For example, IO device 560 can be a graphic card, keyboard or other input device, a hard drive or other storage device, a network interface card, etc. Additionally, the XR system 110 can communicate with other devices, such as the VR content navigation platform 120 illustrated in FIG. 1, using the IO device 560.

The XR computer 510 can include instructions executable by one or more of the XR processors (or, processing elements, such as threads of a XR processor) 512, 514. As illustrated, XR computer 510 includes a plurality of programs, such as XR programs 504A, 504B, 504C (collectively, "XR programs 504"), and 508, and operating systems OS 502 and 506. The XR programs 504 can be, for example, an application program (e.g., an application for generating XR expressions), a function of an operating system (e.g., a device driver capable of operating an IO device, such as 560), or a utility or built-in function of a computer, such as 510. A XR program 504 can be a hypervisor, and the hypervisor can, for example, manage sharing resources of the computer (e.g., a XR processor or regions of a memory, or access to an IO device) among a plurality of programs or OSes. A XR program 504 can be a program that embodies the methods, or portions thereof, of the disclosure. For example, a XR program 504 can be a program that executes on a XR processor 512, 514 of XR computer 510 to perform method 200 of FIG. 2, or portions and/or modifications thereof, within the scope of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
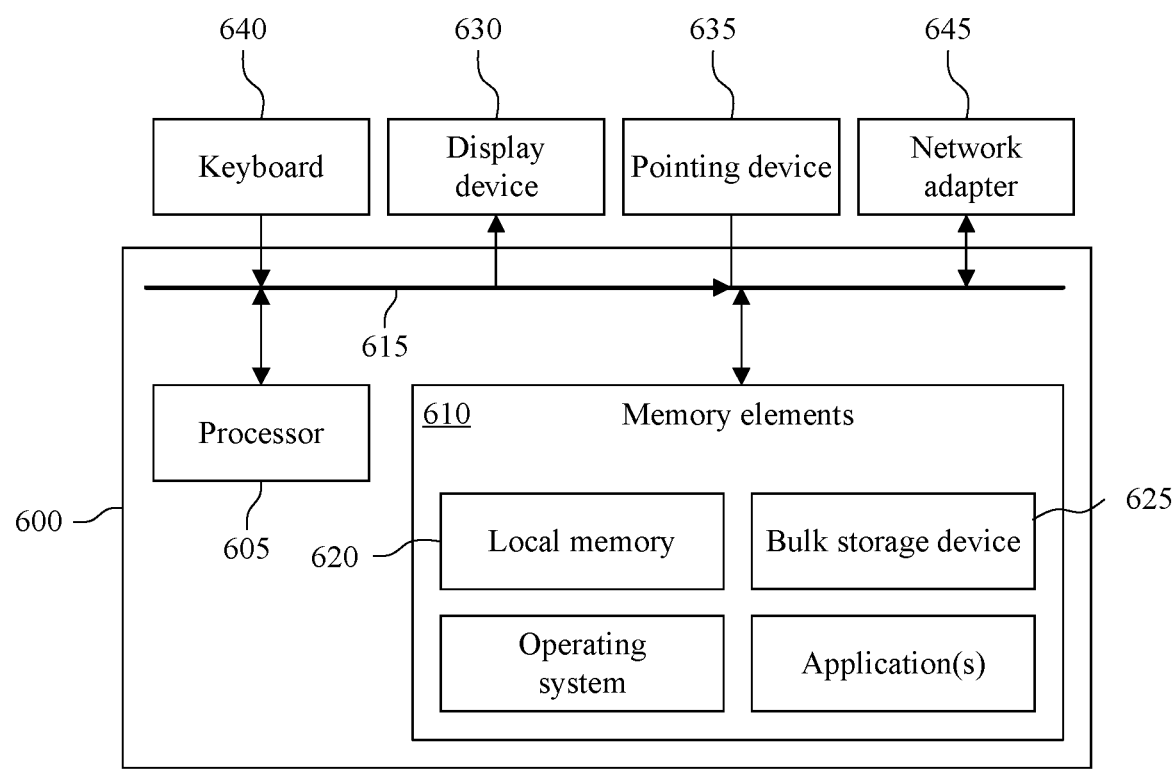
FIG. 6 is a block diagram illustrating an example of computer hardware system for implementing the development server of FIG. 2.

FIG. 6 is a block diagram illustrating example architecture for a data processing service 600 for serving as the parallel presentation platform 120. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a graphics processing unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the parallel presentation platform 120 of FIG. 1. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
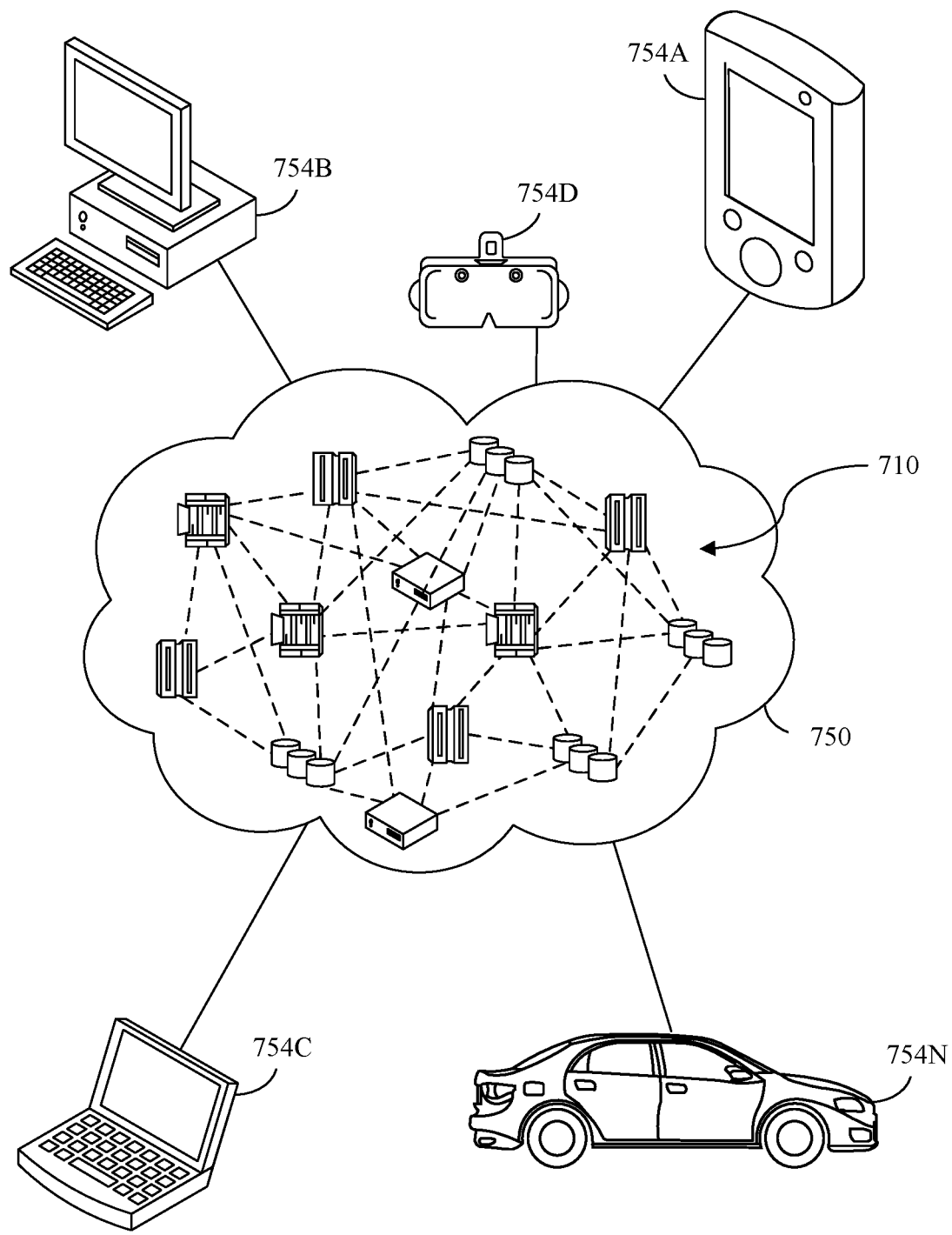
FIG. 7 depicts a cloud computing environment according to an embodiment of the present invention.

Referring now to FIG. 7, illustrative cloud computing environment 750 to be used with the API optimizing system is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, XR headset 754D, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
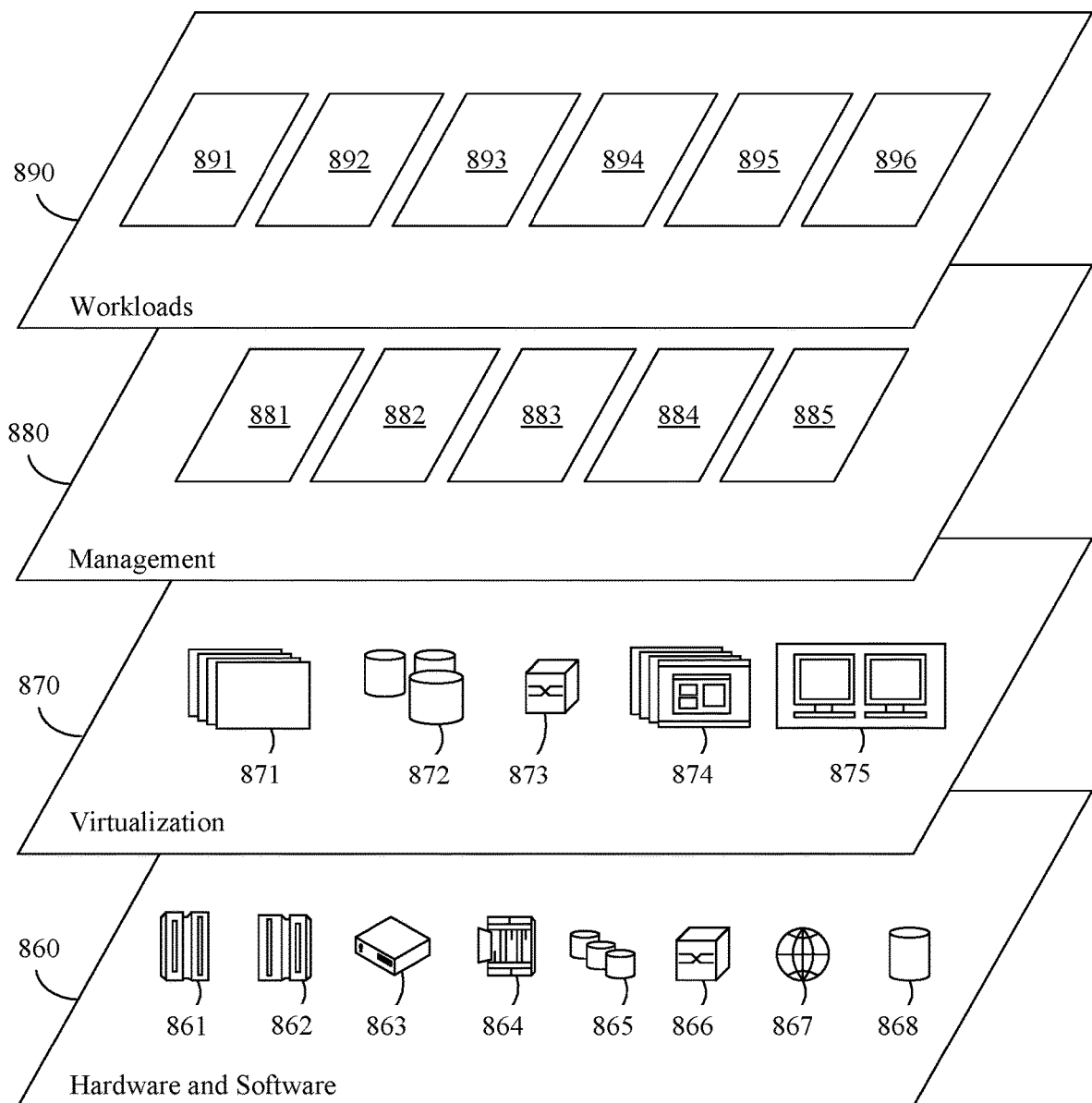
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the VR content navigation platform 896.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be necessarily limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be necessarily limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process within a virtual reality (VR) content navigation platform connected to extended reality (XR) systems respectively associated with a plurality of users, comprising:
    identifying, by the VR content navigation platform, a VR object being contemporaneously viewed by the plurality of users;
    identifying, by the VR content navigation platform, for each of the plurality of users, respective fields of view of the VR object being presented by the XR systems respectively associated with the plurality of users;
    identifying, using a collaboration engine, a plurality of potential collaborators;
    forwarding, to XR systems respectively associated with the plurality of potential collaborators, collaboration requests to join a collaboration regarding a shared field of view; and
    forwarding, to XR systems respectively associated with a plurality of users who positively responded to the collaboration requests, instructions to present the shared field of view, wherein
    each of the XR systems respectively associated with the plurality of users who positively responded to the collaboration requests are configured to simultaneously present the shared field of view during the collaboration.

2. The computer-implemented process of claim 1, wherein
    the shared field of view is dynamically controlled by one of the plurality of users associated with the collaboration.

3. The computer-implemented process of claim 1, wherein
    the collaboration engine identifies the plurality of potential collaborators using a common area of interest.

4. The computer-implemented process of claim 3, wherein
    the common area of interest is automatically generated using the collaboration engine.

5. The computer-implemented process of claim 4, wherein
    the common area of interest is predicted based upon on an analysis of the respective fields of view of the VR object being presented by the XR systems respectively associated with the plurality of users.

6. The computer-implemented process of claim 3, wherein
    the common area of interest is based upon user input received from each of the plurality of users.

7. The computer-implemented process of claim 1, further comprising recording the collaboration.

8. The computer-implemented process of claim 1, wherein
    the VR content navigation platform is operatively connected to a collaboration server hosting the collaboration.

9. An extended reality (XR) navigation system, comprising:
    computer hardware including a VR navigation platform connected to XR systems respectively associated with a plurality of users, wherein the computer hardware is configured to perform:
    identifying, by the VR content navigation platform, a VR object being contemporaneously viewed by the plurality of users;
    identifying, by the VR content navigation platform, for each of the plurality of users, respective fields of view of the VR object being presented by the XR systems respectively associated with the plurality of users;
    identifying, using a collaboration engine, a plurality of potential collaborators;
    forwarding, to XR systems respectively associated with the plurality of potential collaborators, collaboration requests to join a collaboration regarding a shared field of view; and
    forwarding, to XR systems respectively associated with a plurality of users who positively responded to the collaboration requests, instructions to present the shared field of view, wherein
    each of the XR systems respectively associated with the plurality of users who positively responded to the collaboration requests are configured to simultaneously present the shared field of view during the collaboration.

10. The XR navigation system of claim 9, wherein
the shared field of view is dynamically controlled by one of the plurality of users associated with the collaboration.

11. The XR navigation system of claim 9, wherein
the collaboration engine identifies the plurality of potential collaborators using a common area of interest.

12. The XR navigation system of claim 11, wherein
the common area of interest is automatically generated using the collaboration engine.

13. The XR navigation system of claim 12, wherein
the common area of interest is predicted based upon on an analysis of the respective fields of view of the VR object being presented by the XR systems respectively associated with the plurality of users.

14. The XR navigation system of claim 11, wherein
the common area of interest is based upon user input received from each of the plurality of users.

15. The XR navigation system of claim 9, wherein the computer hardware is further configured to perform:
recording the collaboration.

16. The XR navigation system of claim 9, wherein
the VR content navigation platform is operatively connected to a collaboration server hosting the collaboration.

17. A computer program product, comprising:
a computer readable storage medium having stored therein program code,
the program code, which when executed by a computer hardware system including a VR content navigation platform connected to extended reality (XR) systems respectively associated with a plurality of users, cause the computer hardware system to perform:
identifying, by the VR content navigation platform, a VR object being contemporaneously viewed by the plurality of users;
identifying, by the VR content navigation platform, for each of the plurality of users, respective fields of view of the VR object being presented by the XR systems respectively associated with the plurality of users;
identifying, using a collaboration engine, a plurality of potential collaborators;
forwarding, to XR systems respectively associated with the plurality of potential collaborators, collaboration requests to join a collaboration regarding a shared field of view; and
forwarding, to XR systems respectively associated with a plurality of users who positively responded to the collaboration requests, instructions to present the shared field of view, wherein
each of the XR systems respectively associated with the plurality of users who positively responded to the collaboration requests are configured to simultaneously present the shared field of view during the collaboration.

18. The computer program product of claim 17, wherein
the shared field of view is dynamically controlled by one of the plurality of users associated with the collaboration.

19. The computer program product of claim 17, wherein
the collaboration engine identifies the plurality of potential collaborators using a common area of interest,
the common area of interest is automatically generated using the collaboration engine, and
the common area of interest is predicted based upon on an analysis of the respective fields of view of the VR object being presented by the XR systems respectively associated with the plurality of users.

20. The computer program product of claim 17, wherein
the common area of interest is based upon user input received from each of the plurality of users.

* * * * *